United States Patent [19]
Birdwell et al.

[11] 3,783,370
[45] Jan. 1, 1974

[54] METHOD AND CIRCUIT FOR COMPENSATING BARKHAUSEN SIGNAL MEASUREMENTS IN MAGNETIC MATERIALS HAVING A VARIABLE GEOMETRY

[75] Inventors: James A. Birdwell; John R. Barton; Clarence G. Gardner, all of San Antonio, Tex.

[73] Assignee: Southwest Research Institute, San Antonio, Tex.

[22] Filed: Dec. 6, 1972

[21] Appl. No.: 312,675

[52] U.S. Cl. ............. 324/34 R, 73/88.5, 324/34 ST
[51] Int. Cl. ............................................. G01r 33/12
[58] Field of Search ...................... 324/34 R, 34 ST; 73/88.5

[56] References Cited
UNITED STATES PATENTS
3,427,872  2/1969  Leep et al. ......................... 324/34 R
3,588,683  6/1971  Lloyd.................................... 324/37

OTHER PUBLICATIONS
Pasley, R., Barkhausen Effect–An Indication of Stress, Mat. Eval. Vol. 28, No. 7, July 1970, pp. 157–161.

Primary Examiner—Robert J. Corcoran
Attorney—Tom Arnold et al.

[57] ABSTRACT

In one exemplar embodiment, a feedback circuit in a Barkhausen signal measuring system is utilized to reduce variations in the measured Barkhausen signal due to the geometry of the magnetic body. The improvement utilizes a magnetic flux detector disposed in the area adjacent where the Barkhausen signal is measured for detecting the magnetic flux density of the test body. The signal generated by the detector is fed back to a gain control for controlling the gain of the power source providing the time-varying current to the Barkhausen signal measuring system, the gain control controlling the magnitude of the time-varying current in order to maintain the rate of change of the magnetic flux in the body in the area of the detector at a predetermined value.

13 Claims, 6 Drawing Figures

A (NO MAGNETIC FEEDBACK)
0.125 INCH SPECIMEN

B (NO MAGNETIC FEEDBACK)
0.750 INCH SPECIMEN

C (WITH MAGNETIC FEEDBACK)
0.125 INCH SPECIMEN

D (WITH MAGNETIC FEEDBACK)
0.750 INCH SPECIMEN

A  E_IN (SHAPE ONLY)
(NO MAGNETIC FEEDBACK)

D  E_IN (SHAPE ONLY)
PEAK-TO-PEAK LEVEL
100 × THAT OF (A)
(MAGNETIC FEEDBACK)

B (NO MAGNETIC FEEDBACK)
0.125 INCH SPECIMEN

E (MAGNETIC FEEDBACK)
0.125 INCH SPECIMEN

C (NO MAGNETIC FEEDBACK)
0.750 INCH SPECIMEN

F (MAGNETIC FEEDBACK)
0.750 INCH SPECIMEN

1) MEASURING UNIT WITHOUT MAGNETIC FEEDBACK

2) MEASURING UNIT WITH MAGNETIC FEEDBACK

METHOD AND CIRCUIT FOR COMPENSATING BARKHAUSEN SIGNAL MEASUREMENTS IN MAGNETIC MATERIALS HAVING A VARIABLE GEOMETRY

BACKGROUND OF THE INVENTION

The present invention relates to an improvement in apparatus for nondestructive investigation of a stress condition at a given point over a given area in a magnetic material and also relates to a method for accomplishing this inventigation.

The present invention relies on the Barkhausen effect, and it involves a special use of the changes in internal magnetization which occur abruptly as the applied magnetic field is altered. Thus the term "Barkhausen signal" is employed herein to denote the manifestation in useful form for purpose of stress investigation of the abruptly changing ferromagnetic domains or boundaries; it is distinguished from the conventional "Barkhausen noise" which identifies merely the audible evidence that a change in internal magnetization within the domain boundaries has occurred.

A basic discussion of Barkhausen theory and the basic method and apparatus for nondestructive investigation of a ferromagnetic body by means of measuring Barkhausen phenomena may be found in U.S. Pat. No. 3,427,872 entitled "Method and System for Investigating the Stress Condition of Magnetic Materials" issued Feb. 18, 1969 to R. W. Leep and Richard L. Pasley.

Although the Barkhausen effect customarily is described with reference to ferromagnetic materials, the domain theory in ferromagnetics has a very close analogy in ferroelectric materials, including a concept of irreversible processes which are associated with the Barkhausen effect. However, the present invention finds its primary application with regard to ferromagnetic materials and the general term "magnetic" is employed herein to embrace such materials.

It has been found that by deriving a Barkhausen signal and expressing it in terms of factors involved in its derivation, including applied loads and/or applied magnetic fields, excellent qualitative indications of the stress condition of the material can be obtained, and under variable circumstances, quantitative data can be obtained.

However, it has been found that the Barkhausen signal will vary appreciably with a variation in the geometry of the magnetic body. Thus a barkhausen peak signal might decrease substantially, possibly 80 or 90 percent, in a body wherein the thickness of the body increases in order of magnitude five or six times. It is this decrease in the Barkhausen signal for thicker materials that has created problems in interpreting the Barkhausen signal as the geometry of the magnetic body being investigated changes.

Accordingly, the primary feature of the present invention is to provide a novel method and circuit for reducing variations in the Barkhausen signal due to the geometry of the magnetic body.

SUMMARY OF THE INVENTION

The present invention remedies the problems of the prior art by providing a method and circuitry for reducing variations in the Barkhausen signal in a body of magnetic material due to the geometry of the magnetic body, the Barkhausen signal being generated within the body responsive to a variable magnetic field.

According to the principles of this invention, a circuit for reducing variations in the Barkhausen signal in a body of magnetic material due to the geometry of the magnetic body is provided, comprising an electromagnet, controllable power generating means connected to the electromagnet for passing a time-varying current therethrough, detecting means within the magnetic field created by said electromagnet and adopted for response to Barkhausen noise, signal processing means connected to said detecting means for deriving a Barkhausen signal response, and detecting and feedback means within the magnetic field for detecting the magnetic flux density of the body in the area of the Barkhausen noise measurement and generating a signal representative thereof, and applying said signal to said controllable power generating means for controlling the magnitude of the time-varying current applied to said electromagnet and maintaining the rate of change of the magnetic flux of the body adjacent said detecting and feedback means at a predetermined value.

In accordance with a further principle of this invention a method for reducing variations in the Barkhausen signal in a body of magnetic material due to the geometry of the magnetic body is provided, comprising the steps of applying a magnetic field to the area of the material to be investigated, varying the intensity of the applied magnetic field over a substantial range, detecting the Barkhausen noise generated by the material in response to the variations at the magnetic field at the area being investigated, processing the Barkhausen noise to derive a Barkhausen signal, detecting the magnetic flux density of the body in the area of the Barkhausen signal measurement, and controlling the intensity of said applied magnetic field to maintain the rate of change of the magnetic flux of the body at a predetermined value in the area of the magnetic flux density detection.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of the scope of the invention for the invention may admit to further equally effective embodiments.

IN THE DRAWINGS

Figure 1:
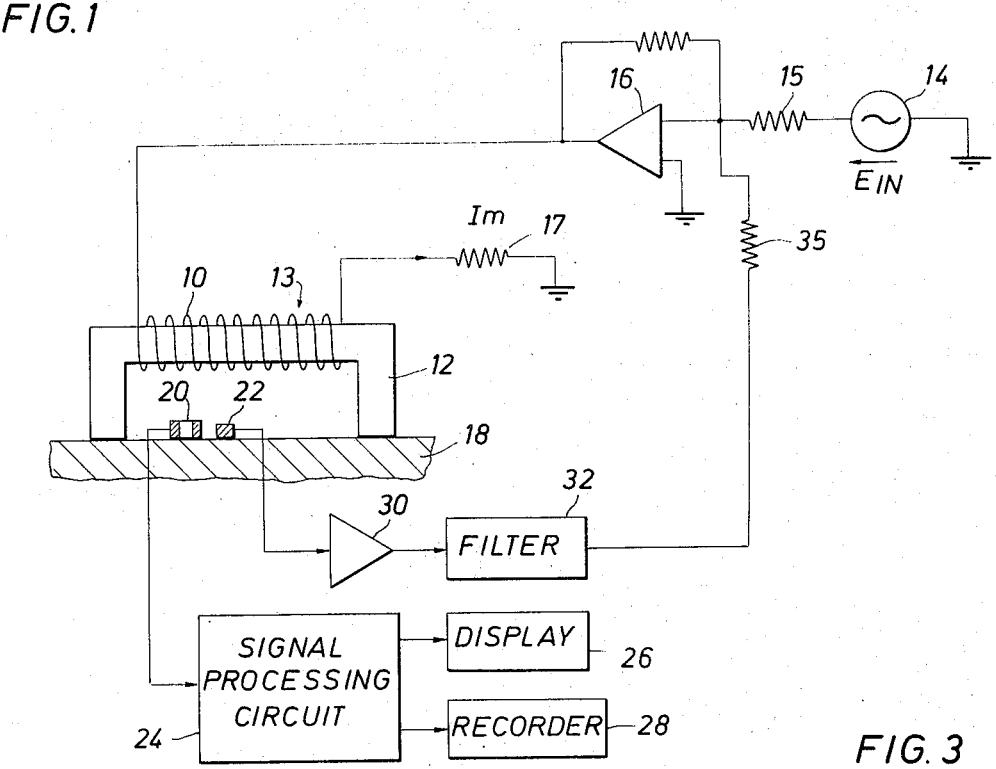

FIG. 1 is a simplified schematic drawing of one embodiment of the invention.

Figure 2:
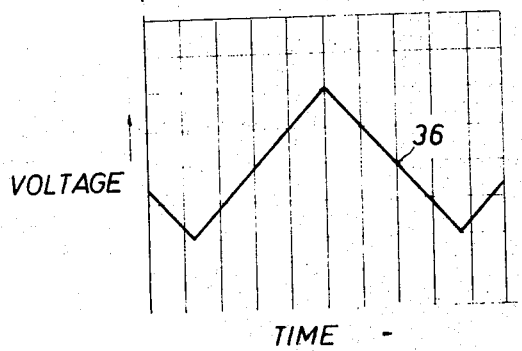
Figure 2:
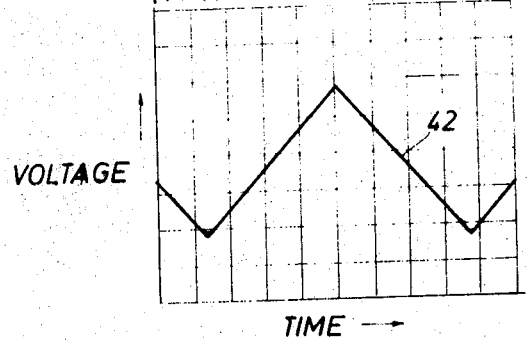
Figure 2:
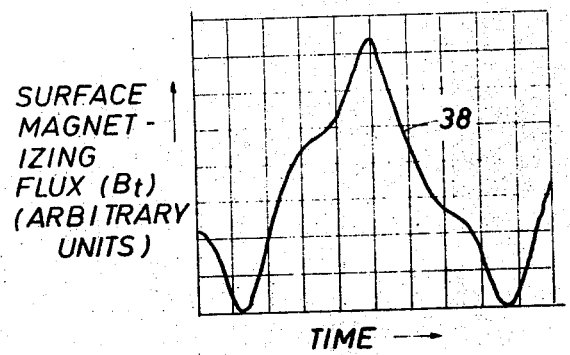
Figure 2:
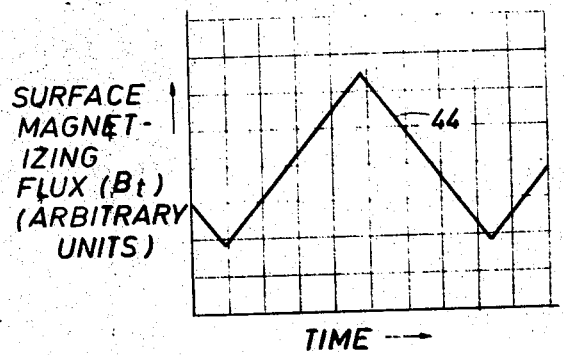
Figure 2:
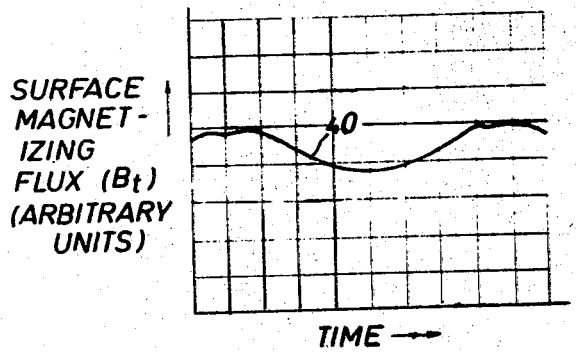
Figure 2:
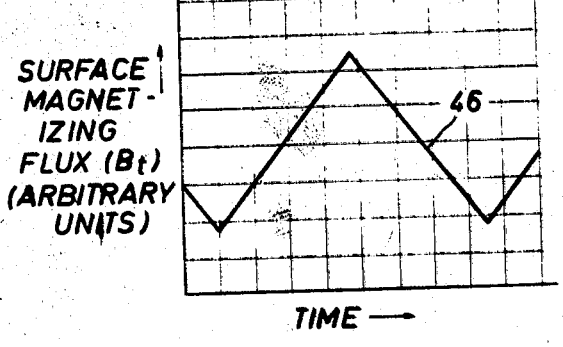

FIG. 2 is a series of drawings showing the relationship between $E_{in}$ and the magnetizing flux ($B_t$) with and without magnetic feedback in specimens of varying geometry.

Figure 3:
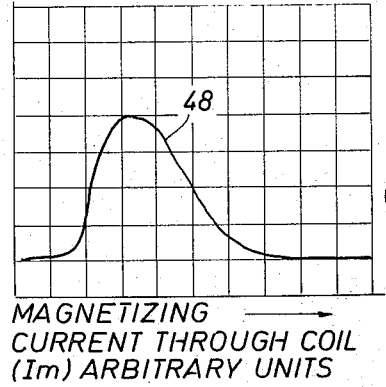
Figure 3:
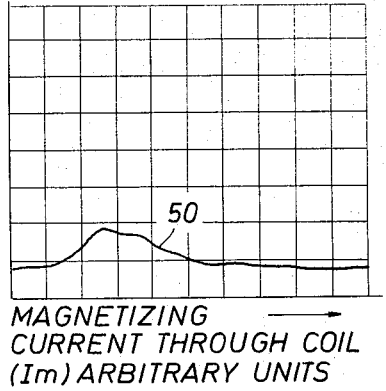
Figure 3:
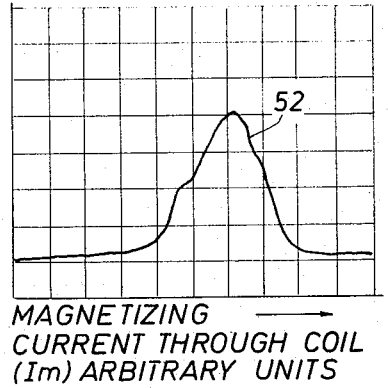
Figure 3:
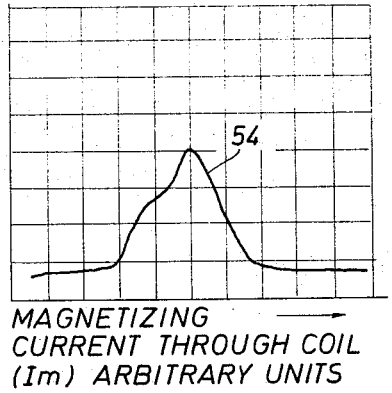

FIG. 3 is a series of curves depicting the comparison between the Barkhausen peak signal ($V_p$) generated in specimens of varying geometry with and without magnetic feedback.

Figure 4:
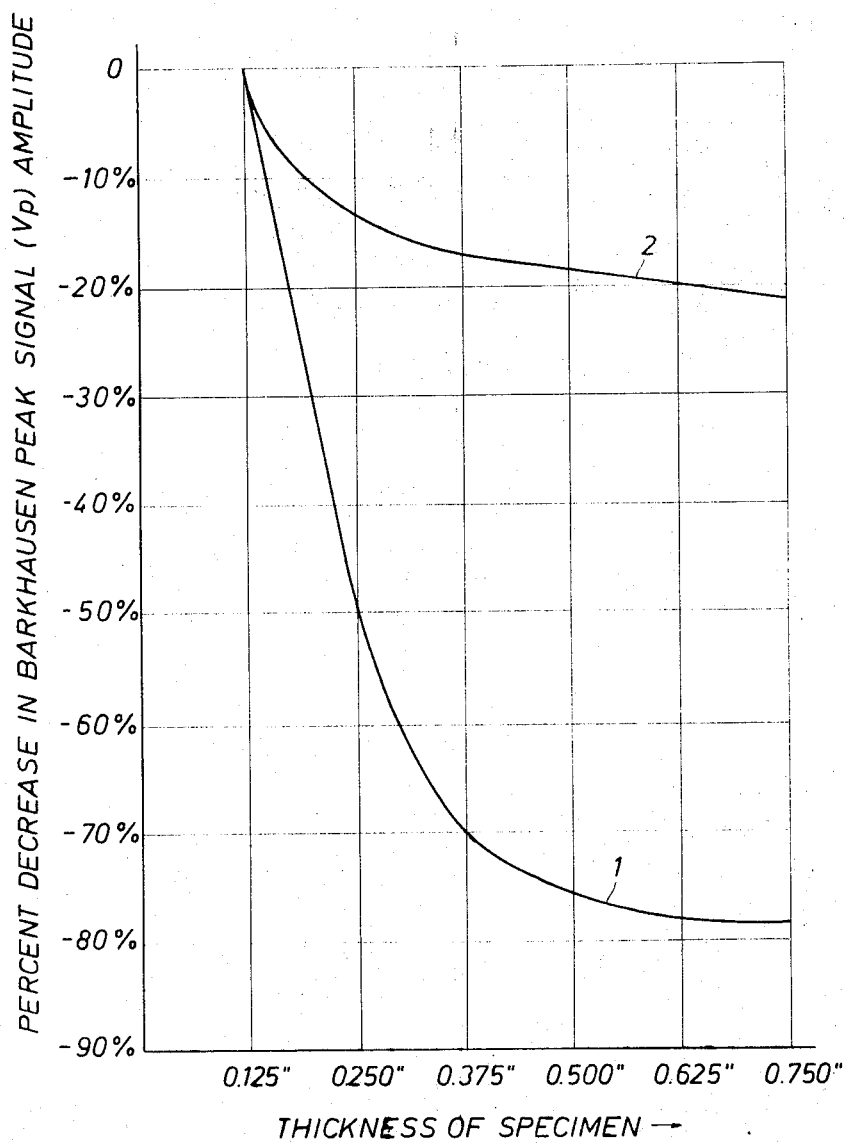

FIG. 4 is a graph depicting the percent decrease in Barkhausen peak signal ($V_p$) amplitude versus thickness of specimen.

Figure 5:
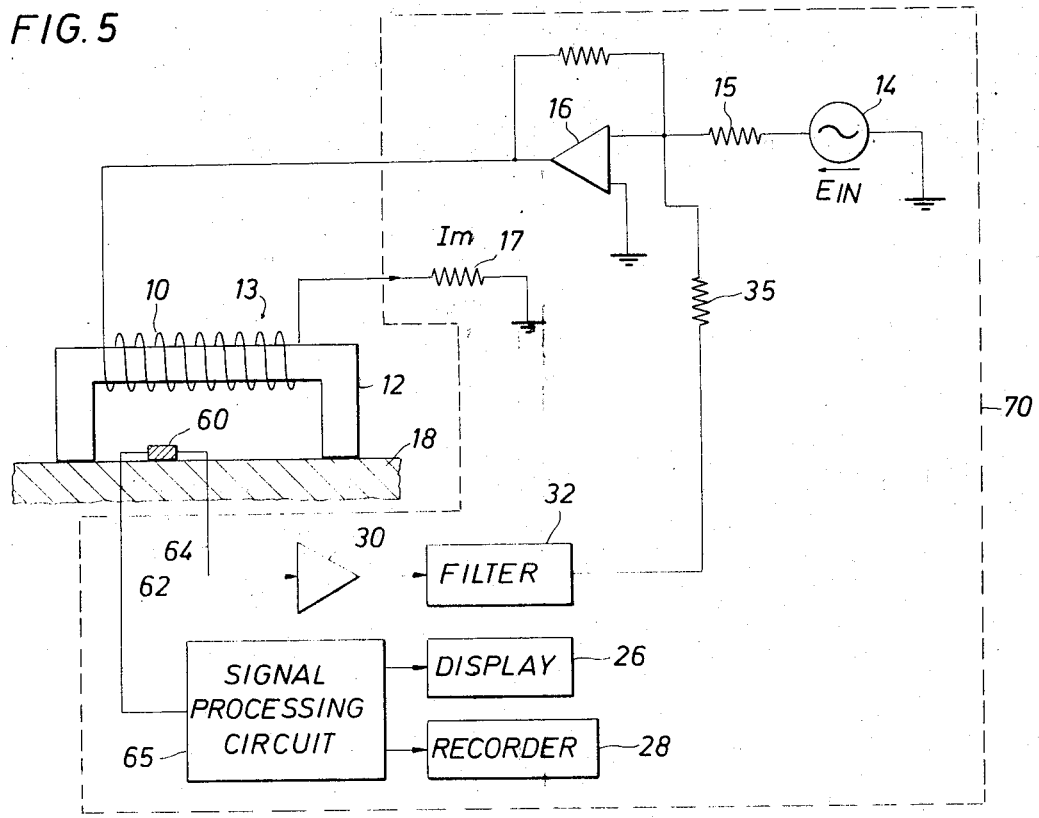

FIG. 5 is a simplified schematic drawing of a second embodiment of the invention.

Figure 6:
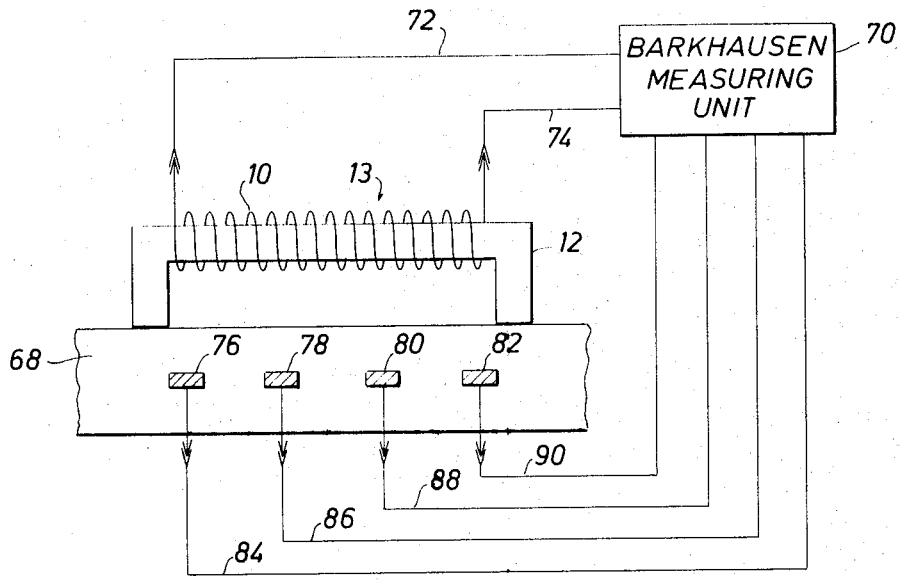

FIG. 6 is a simplified schematic drawing of a third embodiment of the invention.

DESCRIPTION OF THE PREFERRED EMBODIMENT

FIG. 1 shows a magnetic body 18 having a U-shaped core 12 adapted to fit adjacent the surface of body 18, the core having a coil 10 wound on the U-shaped core to form an electromagnet 13, to which a magnetizing time-varying current $I_m$ is applied by means of a power source 14 applying an input voltage $F_{in}$ to resistor 15, forming one leg of a summing junction, and magnetizing voltage driver or gain control means 16. The current through coil 10 is applied through a resistor 17 to ground. A detecting means 20 is placed within the magnetic field generated by electromagnet 13. The detecting means 20 detects the Barkhausen noise generated within the magnetic body 18 and applies the detected Barkhausen noise to a signal processing circuit 24. Signal processing circuit 24 is a conventional Barkhausen noise processing circuit to derive a Barkhausen signal, which signal is applied to a display means 26 and/or to a recorder 28 for appropriate display and recording.

A second detecting means 22 is spaced adjacent detecting coil 20 for detecting the magnetic flux density of the magnetic field created by electromagnet 13 in magnetic body 18 in the area of the Barkhausen signal measurement. The magnetic flux density detected by means 22 is applied as a signal to the input of a conventional amplifier 30 for amplifying the weak detector signal. The output of amplifier 30 is applied to a filter means 32 in which unwanted noise detected by means 22 is filtered and eliminated. The output of filter 32 is applied through resistor 35 as a second input to the summing junction of the operational amplifier 16. The input of the power source 14 is applied through resistor 15 to amplifier 16 as hereinbefore mentioned.

The signal from detector 22 is applied as a feedback signal 180° out-of-phase with the input applied power source signal to the summing junction of the operational amplifier 16, thus creating a feedback loop for controlling the gain of the power source and continuously controlling the value of the time-varying current applied to electromagnet 13 for continuously controlling the value of $I_m$ and maintaining the rate of change of the magnetic flux of the body 18 in the area of detector 22 at a predetermined rate of change, thereby reducing variations in the measured Barkhausen signal due to geometry of the magnetic body.

Filter 32 may be a low-pass filter to filter out some of the high frequency noise which detector 22 picks up but which is unwanted in the feedback signal. It should be noted that the type of filter required depends upon the material under test. It is possible that a high-pass filter or even no filter may be required in specific cases. While power source 14 and the magnetizing voltage driver 16 are shown as separate components, this entire circuitry may of course be replaced by any power source that may be controlled by feedback current, such as a variable gain power source or a power source coupled to any controllable gain control means. Of course, it should be understood that with an extremely sensitive detector means 22 that derives a substantial signal, an amplifier like amplifier 30 may not be necessary. All that is required is that a signal of sufficient strength and definition be generated by detector 22 to function as a feedback signal. The present state of the art in detectors is limited, however, and an amplifier is presently necessary to provide a feedback signal of sufficient strength.

In FIG. 2, a comparison of the wave shape of E and the surface magnetizing flux ($B_t$) for specimens of varying thickness with and without feedback may be seen. In FIG. 2A, $E_{in}$ (shape only) is shown as a saw-tooth wave being applied by a controllable power generating means 14 to an electromagnet 13. The magnetizing flux (without magnetic feedback) is shown in FIG. 2B for a 0.125-inch thick specimen and in FIG. 2C for a 0.750-inch thick specimen. Note the marked change in the rate of change of the magnetizing flux ($B_t$) as shown by curves 38 and 40 as compared with the voltage wave form applied to the magnetizing coil as shown by curve 36.

The significant improvement in the rate of change of the magnetizing flux ($B_t$) can be seen in the FIGS. 2D, E, and F. In FIG. 2D, curve 42 depicts $E_{in}$ (shape only) as applied to the electromagnet 13 with magnetic feedback. The peak-to-peak level of voltage 42 shown in FIG. 2D is actually 100 times that of the voltage 36 shown in FIG. 2A, indicating that the openloop voltage gain is 100 times greater than the closed-loop voltage gain. The magnetizing flux ($B_t$) shown in FIG. 2E by curve 44 shows a direct correspondence between the wave form of the magnetizing flux ($B_t$) and the wave form of $E_{in}$ applied by the power source 14 for a 0.125-inch thick specimen. Furthermore, the wave form of the magnetizing flux ($B_t$) as shown by curve 46 corresponds to the wave form of $E_{in}$ as shown by curve 42, for a 0.750-inch thick specimen with magnetic feedback. The effects of other differences in specimen geometry may be minimized in a like manner.

FIG. 1 shows detectors 20 and 22 on the surface of body 18 merely for simplicity. Of course, detectors 20 and 22 may be disposed within body 18 to detect the Barkhausen noise and the magnetic flux density ($B_t$), respectively. Slots in the body 18 to accommodate the detectors 20 and 22 are one means of achieving such a result. Effective results could be obtained in thick specimen magnetic bodies by disposing the detectors within the body. In thin speciments, however, Barkhausen noise and the magnetic flux density can effectively be detected at the surface of the body 18.

FIG. 3 shows a comparison of a typical Barkhausen signal ($V_p$) versus magnetizing current ($I_m$) through the electromagnet with no magnetic feedback and with magnetic feedback. Curve 48 shown in FIG. 3A is a Barkhausen peak signal ($V_p$) obtained without magnetic feedback from a 0.125-inch thick specimen. A substantial decrease in the peak Barkhausen signal ($V_p$) obtained without magnetic feedback from a 0.750-inch thick specimen is shown by curve 50 in FIG. 3B. FIG. 3C shows the Barkhausen peak signal ($V_p$) at curve 52 obtained with magnetic feedback from 0.125-inch thick specimen, and FIG. 3D shows a Barkhausen peak signal ($V_p$) obtained with magnetic feedback from a 0.750-inch thick specimen as curve 54. Note the substantial increase in the Barkhausen peak signal obtained with feedback shown by curve 54, as contrasted with the Barkhausen peak signal obtained without feedback, shown by curve 50.

FIG. 4 is a graph plotting percent decrease in Barkhausen peak signal ($V_p$) amplitude versus the thickness of the specimen. It can be seen that in curve 1, utilizing a measuring unit without magnetic feedback, the percent decrease in Barkhausen signal ranges from zero (0) for a 0.125-inch thick specimen to an almost 80 percent decrease in Barkhausen peak signal for a 0.750-inch thick specimen. With the measuring unit utilizing magnetic feedback, the curve as shown at 2 is achieved in which there is only a 20 percent variation in amplitude between the 0.125-inch thick specimen and the 0.750-inch thick specimen.

In FIG. 5, a second embodiment of the invention is shown utilizing a single detecting coil or probe. A magnetic body 18 is depicted having a generally U-shaped core 12 adapted to fit adjacent the surface of body 18, the core having a coil 10 wound on the U-shaped core to form an electromagnet 13. A time-varying current, ($I_m$), is applied by means of a power source 14 applying an input voltage ($E_{in}$) to the circuit as hereinabove described. A detecting means 60 is placed within the magnetic field generated by electromagnet 13. The detecting means 60 detects the Barkhausen noise generated within the magnetic field applied to magnetic body 18 and applies the detected Barkhausen noise signal to a signal processing circuit 65 via conductor 62. The signal processing circuit 65 differs from the processing circuit 24 hereinabove described only in that it may contain appropriate filters to filter out unwanted low frequency components, such as the magnetic flux density signal.

Detecting means 60 also applies the Barkhausen noise and the detected magnetic flux density signals via conductor 64 as an input to amplifier 30. Amplifier 30 amplifies the weak signals and applies the signals to filter 32 where the Barkhausen noise signal is filtered out, the remaining magnetic flux density signal being applied to the input summing junction of operational amplifier 16 as hereinabove described for purpose of feedback control of the value of the magnetizing current ($I_m$). Detector 60 may conveniently be a single coil or a semiconductor probe, for example a Hall probe. Reference number 70 denotes the Barkhausen measuring unit, the components of which are common to the circuit above described with reference to FIG. 1.

As hereinbefore mentioned, the detectors for the Barkhausen noise and the flux density signals may be disposed within the magnetic body under test. Such applications might involve various types of structure that have stress points of particular interest that are not readily accessible after the structure is completed. For example, a bridge would have many points of stress that need to be periodically examined to determine the condition of the bridge and its safe loading capacity. However, many of the bridge stress points are not readily accessible after the bridge is completed, and the labor and time involved in such an inspection is considerable.

Accordingly, a third embodiment of the invention is shown in FIG. 6. A magnetic bridge support structure 68 is shown having an array of detector elements 76, 78, 80 and 82 disposed within the body. These detector elements may be inserted in holes or slots cast or drilled into magnetic body 68, or the detector elements may be formed into the material when it is manufactured. The array of detector elements 76, 78, 80 and 82 may conveniently be detector coils or solid state detectors. A core 12 is adapted to fit adjacent the surface of body 68, the core having a coil 10 wound on the core to form an electromagnet 13. Of course, the electromagnet is shown disposed adjacent the surface of magnetic body 68, which would be practical for thin materials. However, if the material 68 was of such a thickness that it could accommodate the electromagnet 13, then the electromagnet could be disposed inside the magnetic body 68 in the vicinity of the array of sensing elements 76–82.

The array of sensing elements 76, 78, 80 and 82 may be remotely located adjacent a stress point in the bridge structure. Leads from the plurality of detectors 76–82 may be brought to another remote point that is convenient for taking measurements and there terminate in plugs as shown. Similarly, the windings of electromagnet 13 have leads that could terminate at the same convenient remote location and there terminate in plugs as shown. A Barkhausen measuring unit 70 containing the basic measuring equipment as defined by 70 in FIG. 5 could be assembled in a portable unit that could be located in the remote convenient location for plugging into the electromagnet winding plugs and the sensing element plugs to power the electromagent and take readings from the sensors via conductors 72, 74, 84, 86, 88 and 90. Conductors 84, 86, 88 and 90 are shown as single leads for simplicity, but in practice would probably be at least a pair of leads to carry the Barkhausen noise signals and the magnetic flux density signals to the Barkhausen measuring unit 70 for appropriate processing and display. The feedback loop hereinabove described would be a part of unit 70 for controlling the magnitude of current applied to winding 10 of electromagnet 13 for maintaining the magnetic flux density at a predetermined level as hereinabove described.

In the apparatus described in connection with FIG. 6, the electromagnet may permanently be disposed within the material as hereinabove described or permanently mounted adjacent the surface of the magnetic body 68. It may be mounted within a housing to protect the electromagnet from weather, etc. This apparatus lends itself to remote applications in structures such as bridges, buildings and the like for monitoring stress areas either continuously or periodically.

Numerous variations and modifications may obviously be made in the structure herein described without departing from the present invention. Accordingly, it should be clearly understood that the forms of the invention herein described and shown in the figures of the accompanying drawings are illustrative only and not intended to limit the scope of the invention.

What is claimed is:

1. In a system for deriving and displaying the Barkhausen signal generated within a body of magnetic material responsive to a variable magnetic field having an electromagnet, a power source connected to the electromagnet for passing a time-varying current therethrough, detecting means within the magnetic field created by the electromagnet adapted for response to Barkhausen noise, and signal processing means connected to the detecting means for deriving a useful Barkhausen signal, the improvement comprising
    magnetic flux density detecting means for detecting the magnetic flux density of the body in the area of the Barkhausen noise measurement and generating a signal representative thereof, and
    gain control means for receiving said magnetic flux density signal and controlling the gain of the power source for controlling the time-varying current applied to the electromagnet and maintaining the rate of change of the magnetic flux of the body adjacent the magnetic flux density detecting means at predetermined value for reducing variations in the measured Barkhausen signal due to the geometry of the magnetic body.

2. A circuit for reducing variations in the Barkhausen signal, generated within a body of magnetic material responsive to a variable magnetic field, due to the geometry of the magnetic body, comprising an electromagnet, controllable power generating means connected to the electromagnet for passing a time-varying current therethrough, first detecting means within the magnetic field created by said electromagnet and adapted for response to Barkhausen noise, signal processing means connected to said detecting means for deriving a Barkhausen signal response, second detecting means within the magnetic field for detecting the magnetic flux density of the body in the area of the Barkhausen noise measurement and generating a signal representative thereof, and feedback means for applying said magnetic flux density signal to said controllable power generating means for controlling the magnitude of the time-varying current applied to said electromagnet and maintaining the rate of change of the magnetic flux of the body adjacent said second detecting means at a predetermined value.

3. The circuit as described in claim 2, wherein said controllable power generating means comprises a power source for generating a time-varying current, and a variable gain control disposed between said power source and said electromagnet.

4. The circuit as described in claim 2, wherein said controllable power generating means comprises a variable gain power source for generating a time-varying current.

5. The circuit as described in claim 2, wherein said feedback means may include, an amplifier, and a filter for filtering noise detected by said second detecting means.

6. A circuit for reducing variations in the Barkhausen signal in a body of magnetic material due to the geometry of the magnetic body, the Barkhausen signal being generated within the body responsive to a variable magnetic field, comprising an electromagnet, a power source connected to said electromagnet for passing a time-varying current therethrough, first detecting means disposed within the magnetic field created by the electromagnet and adapted for generating a first signal in response to variations in Barkhausen noise, signal processing means connected to said first detecting means for deriving a Barkhausen signal from said first signal, second detecting means disposed within the magnetic field adjacent said first detecting means for detecting the magnetic flux density of the body in the area of said first detecting means and generating a second signal representative thereof, an amplifier receiving said second signal for amplifying said signal, a filter receiving said amplified second signal and filtering noise detected by said second detecting means, and an operational amplifier connected between said power source and said electromagnet, the power source input being applied as one input to a summing junction, said second signal received from said filter being applied as a second input to said summing junction, the net input signal from said summing junction causing said operational amplifier to control the magnitude of said time-varying current applied to said electro-magnet for maintaining the rate of change of the magnetic flux of the body adjacent said second detecting means at a predetermined value.

7. A method for reducing variations in the Barkhausen signal in a body of magnetic material due to the geometry of the magnetic body, the Barkhausen signal being generated within the body responsive to a variable magnetic field, comprising the steps of applying a magnetic field to the area of the material to be investigated, varying the intensity of the applied magnetic field over a substantial range, detecting the Barkhausen noise generated by the material in response to the variations in the magnetic field at the area being investigated, processing the Barkhausen noise to derive a Barkhausen signal, detecting the magnetic flux density of the body in the area of the Barkhausen signal measurement, and controlling the intensity of said applied magnetic field to maintain the rate of change of the magnetic flux of the body at a predetermined value in the area of the magnetic flux density detection means.

8. A circuit for reducing variations in the Barkhausen signal, generated within a body of magnetic material responsive to a variable magnetic field, due to the geometry of the magnetic body, comprising an electromagnet, controllable power generating means connected to the electromagnet for passing a time-varying current therethrough, detecting means within the magnetic field created by said electromagnet for responding to Barkhausen noise and for detecting the magnetic flux density of the body and generating signals representative thereof, signal processing means connected to said detecting means for deriving a Barkhausen signal response, and feedback means connected to said detecting means for applying said magnetic flux density signal to said controllable power generating means for controlling the magnitude of the time-varying current applied to said electromagnet and maintaining the rate of change of the magnetic flux of the body adjacent said detecting means at a predetermined value.

9. The circuit as described in claim 8, wherein said controllable power generating means comprises a power source for generating a time-varying current, and a variable gain control disposed between said power source and said electromagnet.

10. The circuit as described in claim 8, wherein said controllable power generating means comprises a variable gain power source for generating a time-varying current.

11. The circuit as described in claim 8, wherein said feedback means may include,
an amplifier, and
a filter for filtering noise detected by said detecting means.

12. Apparatus for reducing variations in the Barkhausen signal in a body of magnetic material due to the geometry of the magnetic body, the Barkhausen signal being generated within the body responsive to a variable magnetic field, comprising
an electromagnet,
controllable power generating means connected to the electromagnet for passing a time-varying current therethrough,
a plurality of first detecting means within the magnetic field created by said electromagnet and adapted for response to Barkhausen noise,
signal processing means connected to said detecting means for deriving a Barkhausen signal response,
a plurality of second detecting means within the magnetic field for detecting the magnetic flux density of the body in the area of the Barkhausen noise measurement and generating a signal representative thereof, and
feedback means for applying said magnetic flux density signal to said controllable power generating means for controlling the magnitude of the time-varying current applied to said electromagnet and maintaining the rate of change of the magnetic flux of the body adjacent said plurality of second detecting means at a predetermined value.

13. Apparatus for reducing variations in the Barkhausen signal, generated within a body of magnetic material responsive to a variable magnetic field, due to the geometry of the magnetic body, comprising
an electromagnet,
controllable power generating means connected to the electromagnet for passing a time-varying current therethrough,
a plurality of detecting means within the magnetic field created by said electromagnet for responding to Barkhausen noise and for detecting the magnetic flux density of the body and generating signals representative thereof,
signal processing means connected to said plurality of detecting means for deriving a Barkhausen signal response, and
feedback means connected to said plurality of detecting means for applying said magnetic flux density signal to said controllable power generating means for controlling the magnitude of the time-varying current applied to said electromagnet and maintaining the rate of change of the magnetic flux of the body adjacent said plurality of detecting means at a predetermined value.

* * * * *